United States Patent [19]
Ryan et al.

[11] Patent Number: 6,120,056
[45] Date of Patent: Sep. 19, 2000

[54] SELF-LOCKING AIR BAG RETAINER

[75] Inventors: Shawn Gregory Ryan, Dayton, Ohio; James Lloyd Webber, Shelby Township, Mich.

[73] Assignee: General Motors Corporation, Detroit, Mich.

[21] Appl. No.: 09/069,913

[22] Filed: Apr. 30, 1998

[51] Int. Cl.[7] .................................................. B60R 21/16
[52] U.S. Cl. ....................................... 280/728.2; 280/732
[58] Field of Search ........................... 280/728.2, 728.3, 280/728.1, 731, 732, 743.1; 292/19, 80

[56] References Cited

U.S. PATENT DOCUMENTS

| | | | |
|---|---|---|---|
| 5,261,692 | 11/1993 | Kneip et al. | 280/728.2 |
| 5,435,596 | 7/1995 | Rose et al. | 280/728.2 |
| 5,482,313 | 1/1996 | Ikeya et al. | 280/728.2 |
| 5,607,179 | 3/1997 | Lenart et al. | 280/728.2 |
| 5,639,112 | 6/1997 | Phillion et al. | 280/728.2 |
| 5,667,241 | 9/1997 | Bunker et al. | 280/730.2 |
| 5,775,724 | 7/1998 | Tonooka et al. | 280/728.2 |
| 5,857,696 | 1/1999 | Inoue et al. | 280/728.2 |
| 5,876,058 | 3/1999 | Nemoto | 280/728.2 |

*Primary Examiner*—J. J. Swann
*Assistant Examiner*—Christopher Bottorff
*Attorney, Agent, or Firm*—Kathryn A. Marra

[57] ABSTRACT

An air bag module in a vehicle includes an air bag having a thickened mouth portion. The air bag module further includes a housing for housing the air bag and including a tapered neck portion. The module further includes a self-locking retainer having outwardly tapered retainer walls that are sized and shaped for engagement with the tapered neck portion of the housing. The thickened mouth portion of the air bag is trapped below the retainer such that upon air bag deployment, the air bag forces the tapered retainer walls into increasing engagement with the tapered neck walls such that the retainer and air bag are securely locked onto the housing.

6 Claims, 3 Drawing Sheets

SELF-LOCKING AIR BAG RETAINER

This invention relates to a vehicle air bag module, and more particularly to a self-locking retainer for mounting an air bag to the module.

BACKGROUND OF THE INVENTION

It is well known in motor vehicles to provide an air bag module mounted beneath an opening in the instrument panel. The module typically includes a metal housing having opposing side walls and end walls defining an air bag deployment opening. The module also typically includes an air bag having a mouth portion mounted to the housing by an air bag retainer. The air bag retainer typically has retainer apertures which must be aligned with corresponding air bag apertures on the mouth portion of the air bag. Since the air bag is a flexible material, the air bag retainer is needed to provide support to the mouth portion of the air bag for easier attachment of the air bag to the housing. The housing has housing apertures which must be aligned with the retainer apertures and air bag apertures so that fasteners can be inserted through all three sets of aligned apertures to attach the air bag and retainer to the housing. An inflator is mounted beneath the air bag in the housing and discharges inflator gas to inflate the air bag when sensing predetermined vehicle conditions. The opening in the instrument panel is typically covered by a hinged cover door which is forced open by the deploying air bag.

Some air bag retainers are known in the prior art which include a hem portion into which an attachment rod is sewn. These are typically used with extruded housings having channels into which the rods and the air bag may be axially inserted. However, this arrangement requires an extruded housing and is not readily adaptable to deep drawn or plastic housings. In addition, this arrangement can be difficult to assemble since the rod with the air bag wrapped around the rod must be axially inserted through the channel which runs the length of the air bag housing. In addition, it is difficult to mount the air bag with rods on any more than two sides of the mouth portion of the air bag.

It is also known in the prior art to mount a cover door to the housing for covering the air bag module in the folded condition prior to deployment. The cover door is typically rigidly mounted to either the housing or the instrument panel by a plurality of fasteners. Thus, the cover door is typically not adjustable in the vertical direction for adapting to different tolerances during vehicle assembly.

SUMMARY

The present invention solves the shortcoming of the prior art by providing an air bag retainer which is easily adapted for use with any type of housing construction, including deep drawn and plastic housings. The retainer advantageously has a self-locking feature that forces the retainer to grip the housing more securely during air bag deployment. Advantageously, the air bag retainer may be easily assembled even with air bag attachment features on all four sides of the mouth portion of the air bag. In addition, the air bag retainer also provides for adjustable attachment of an air bag cover door so that a single component preferably retains both the air bag and cover door. Furthermore, the retainer allows for attachment of both the air bag and the cover door to the housing without the use of fasteners.

These advantages and alternatives are accomplished in a preferred form of the invention by providing an air bag module in a vehicle including an air bag having a thickened mouth portion. The air bag module further includes a housing for housing the air bag and including a tapered neck portion. The module further includes a self-locking retainer having outwardly tapered retainer walls that are sized and shaped for engagement with the tapered neck portion of the housing. The thickened mouth portion of the air bag is trapped below the retainer such that upon air bag deployment, the air bag forces the tapered retainer walls into increasing engagement with the tapered neck walls such that the retainer and air bag are securely locked onto the housing.

Preferably, the housing is made of deep drawn metal or molded plastic. Also preferably, the retainer is made of a continuous onepiece construction. Preferably, the thickened mouth portion, retainer, and housing are generally rectangular having four sides and the mouth portion engages the retainer and housing on all four sides to distribute air bag forces during deployment. Preferably, at least a portion of the neck walls are sized smaller than the retainer walls such that the retainer is forced into secure engagement with the housing during air bag inflation.

In accordance with other preferred aspects of the invention, the module includes a cover door having a least one downwardly extending side flange having an aperture therethrough. In addition, the retainer includes downwardly directed tabs adapted for extending through the apertures such that upon air bag deployment, the force of the deploying air bag anchors the side flanges of the cover door beneath the tabs. Preferably, the apertures are sized greater than the tabs such that the cover door is adjustable relative to the retainer and housing during assembly.

Preferably, the air bag module is assembled by providing an air bag housing having an upper tapered neck portion and a lower portion positioned below the neck portion and providing an air bag having a thickened mouth portion and dropping the thickened mouth portion over an outside surface of the housing. The module is further assembled by providing a retainer having tapered retainer walls and inserting a lower portion of the housing through the retainer until the retainer engages the neck portion and traps the thickened mouth portion of the air bag beneath the retainer. Finally, the retainer is securely locked to the neck portion by deployment of the air bag.

BRIEF DESCRIPTION OF THE DRAWINGS

An embodiment of the present invention is described, by way of example only, with reference to the accompanying drawings in which.

DESCRIPTION OF THE PREFERRED EMBODIMENT

Figure 1:
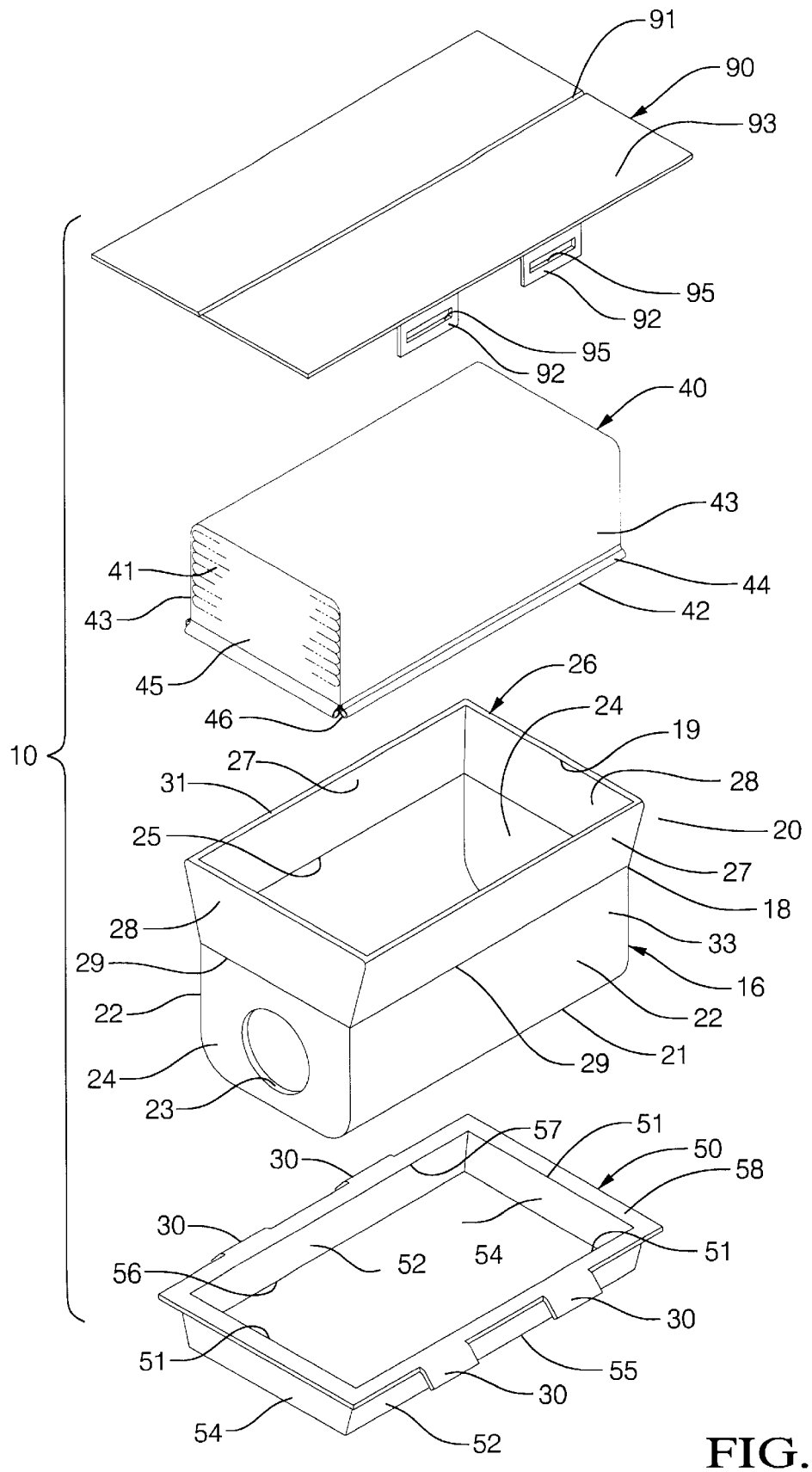
FIG. 1 is an exploded perspective view of an air bag module including a housing, an air bag, a cover door, and a self-locking retainer.

Referring to FIG. 1, an air bag module 10 includes the component parts of a housing 20, a self-locking retainer 50, a cover door 90, an air bag 40, and a plurality of air bag rods 46 attached to the air bag 40. The module 10 also preferably includes an inflator 7 for generating gas to inflate the air bag 40. An inflator 7 is normally mounted in a lower portion 16 of the housing 20 for discharging inflator gas upon sensing predetermined vehicle conditions to inflate the air bag 40. The inflator 7 may be of any construction, but preferably is an axially elongated cylinder which can be press fit into the housing 20, as described further hereinafter. The module 10 is typically mounted beneath the instrument panel (not shown) of a vehicle and covered by the cover door 90 prior to deployment.

The housing 20 is preferably a canister having a lower portion 16 and an upper tapered neck portion 26. The lower portion 16 includes a U-shaped bottom wall 21 terminating in upstanding spaced apart opposing side walls 22 connected by spaced apart opposing end walls 24. The side walls 22 and end walls 24 are at right angles to each other. The side walls 22 are parallel to each other and the end walls 24 are parallel to each other. The side walls 22 and end walls 24 cooperatively define a generally rectangular inner housing opening 25. The lower portion 16 of the housing 20 is shaped for holding the inflator 7 and also may house a portion of the folded air bag 40 prior to deployment that sits atop the inflator 7. As shown in FIG. 1, one of the end walls 24 includes an inflator opening 23 through which the inflator 7 can be axially inserted and press fit to the housing 20.

Advantageously in accordance with the present invention, the housing 20 also includes an upper tapered neck portion 26 in which a portion of the air bag 40 is normally stored prior to inflation. The housing 20, including the lower portion 16 and the upper tapered neck portion 26, are preferably integrally formed as a single component by any suitable method. Preferably, the housing 20 may be made by deep drawing metal as or by molding plastic. Advantageously, the retainer 50 of this invention may be used on a variety of housings 20 made by a variety of methods. It will be appreciated that the housing 20 could also be made as an extrusion with end walls attached or as stamped steel. Although the lower portion 16 and the upper tapered neck portion 26 are preferably integrally formed, it will also be appreciated that they could be separately formed and that the bottom edges 29 of the upper tapered neck portion 26 could be secured to top edges 18 of the lower portion 16 by any suitable method, such as by welding.

The upper tapered neck portion 26 includes spaced apart, opposing, nonparallel, side neck walls 27 connected by spaced apart, opposing, nonparallel, end neck walls 28. It will be appreciated that unlike the lower portion 16, the pair of side neck walls 27 and end neck walls 28 are not parallel to each other. Instead, the side and end neck walls 27, 28 diverge away from each other and are outwardly tapered. The side and end neck walls 27, 28 each have bottom edges 29 that are preferably integrally connected to the lower portion 16 at the inner housing opening 25. The side and end neck walls 27, 28 each have upper edges 31 that are spaced outwardly away from the bottom edges 29. Thus, the side and end neck walls 27, 28 are each tapered outwardly away from the top edges 18 of the lower portion 16 and away from the inner housing opening 25. The side neck walls 27 and end neck walls 28 cooperatively define a generally rectangular housing opening 19, which is larger than the inner housing opening 25.

Figure 2:
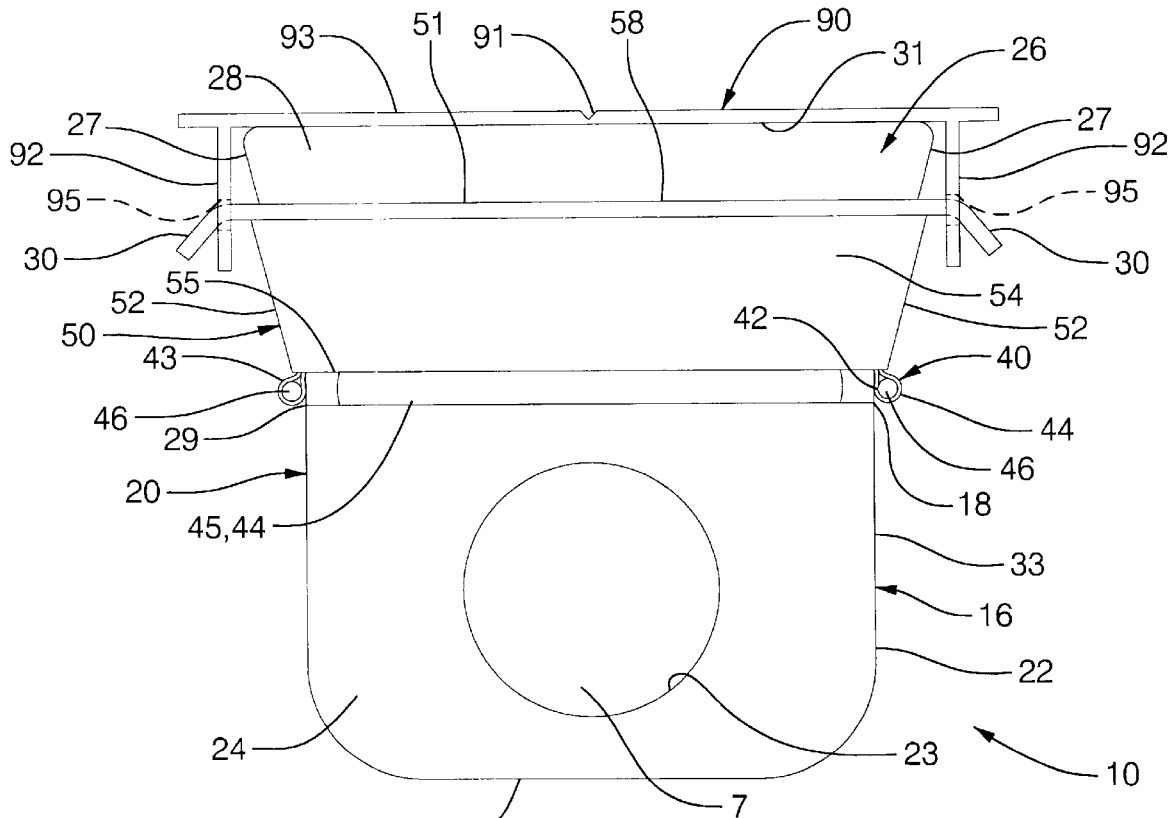
FIG. 2 is side view of the air bag module of FIG. 1 shown in a fully assembled condition.

Referring to FIGS. 1–2, the air bag 40 is made of a conventional fabric material and is normally stored in a folded condition in the housing 20 atop of the inflator 7. The air bag 40 includes a main folded portion 41 and a thickened mouth portion 42 forming an air bag opening 44 for receiving inflator gas therethrough. The mouth portion 42 is thickened by including a peripheral hem portion 44 formed by appropriately folding and stitching the air bag material into a loop and axially inserting a rod 46 therethrough, as described further hereinafter. The mouth portion 42 of the air bag 40 includes opposing side mouth portions 43 and opposing end mouth portions 45 such that the mouth portion 42 has a generally rectangular shape with four sides. A plurality of air bag rods 46 are assembled to the air bag 40 by axial insertion into each of the side and end mouth portions 43, 45. While this embodiment preferably shows a foursided mouth portion 42 and four corresponding rod 46 for the greatest area of securement of the mouth portion 42 to the housing 20 and the greatest distribution of forces on the housing 20 during deployment, it will be appreciated that less rod portions 46 may be used. It will also be appreciated that the rods 46 could also simply be formed by folding over the air bag material in multiple layers and need not be separate from the air bag 40. It will further be appreciated that the side mouth portions 43 are preferably not connected to the end mouth portions 45 such that the mouth portion 42 is sized large enough to open up and slip over the upper edges 31 of the upper tapered neck portion 26 during assembly.

The cover door 90 is preferably made of a plastic material and has an outer show upper surface 93 which preferably matches that of the instrument panel. The upper surface 93 includes a suitable tear seam 91 which breaks open during deployment under the force of the inflating air bag 40. The cover door 90 also includes side flanges 92 located on opposing side edges of the cover door 90. The side flanges 92 are preferably integrally formed with the upper surface 93 and are hingedly connected thereto to permit the halves of the upper surface 93 to pivot open upon air bag deployment. The side flanges 92 include oversized apertures 95 therethrough which are sized for adjustable attachment to the retainer 50, as described further hereinafter. The apertures 95 are equivalent in number and spaced for corresponding alignment with downwardly bent tabs 30 on the retainer 50 when the cover door 90 is attached to the retainer 50. While the side flanges 92 are shown as two on each side of the cover door 90, it will be appreciated that the side flanges 92 could also be a single flange with apertures 95 therethrough.

The self-locking retainer 50 is preferably a one-piece continuous frame which be made of any material having suitable strength, such as steel or molded plastic. The retainer 50 includes spaced apart opposing, nonparallel, side retainer walls 52 connected by spaced apart opposing, nonparallel, end retainer walls 54. The side and end retainer walls 52, 54 diverge away from each other and are outwardly tapered to match the angle of the taper on the side and end neck walls 27, 28 of the housing 20. The side and end retainer walls 52, 54 each have bottom retainer edges 55 which cooperatively form a lower retainer opening 56 that is slightly larger than the bottom edges 29 of the upper tapered neck portion 26. The side and end retainer walls 52, 54 each have upper retainer edges 51 that are spaced outwardly away from the bottom retainer edges 55. Thus, the side and end retainer walls 52, 54 are each outwardly tapered to generally match the taper of the side and end walls 27, 28. The upper retainer edges 51 of the side and end retainer walls 52, 54 cooperatively define a generally rectangular upper retainer opening 57, which is larger than the lower retainer opening 56. The lower retainer opening 56 is preferably slightly larger than the inner housing opening 25, but significantly smaller than the housing opening 19 such that the bottom retainer edges 55 are sized for slipping over the bottom edges 29 of the upper tapered neck portion 26 of the housing 20, but not for sliding up the majority of the side and end neck walls 27, 28. The upper retainer opening 57 is preferably slightly smaller than the housing opening 19 such that the retainer 50 cannot be pulled upwardly over the upper edges 31 of the side and end neck walls 27, 28.

Thus, it will be appreciated that the retainer 50 is sized and tapered for slipping onto and increasingly engaging the upper tapered neck portion 26 of the housing 20 as the retainer 50 is pushed upwardly on the housing 20. Normally, the retainer 50 is retained on the housing 20 by a slight press fitted interference between the side and end retainer walls 52, 54 and the side and end neck walls 27, 28. However, upon air bag deployment, the self-locking retainer 50 increases engagement with the housing 20 for secure anchoring of the air bag 40 during deployment, as described hereinafter.

The retainer 50 also includes a generally outwardly projecting flange portion 58 that attaches to the upper retainer edges 5 1. A plurality of downwardly bent tabs 30 extend downward from the flange portion 58. The flange portion 58 and the tabs 30 are preferably integrally formed with the retainer 50. The tabs 30 are preferably equivalent in number and spaced for corresponding alignment with the apertures 95 on the cover 90. In addition, the cover apertures 95 are also preferably sized somewhat greater than the thickness of the tabs 30, such that the cover door 90 is adjustable when mounted to the retainer 50. It will also be appreciated that the tabs 30 each have a length greater than the height of the apertures 95 such that the cover door 90 resists slipping off the retainer 50 during assembly. However, it will be appreciated that the apertures 95 need not be oversized and could alternately provide a tighter snap-fitted attachment.

The air bag module 10 is assembled as follows with reference to FIG. 1 and 2. The hem portion 44 of the air bag 40 is preferably formed by suitably folding and sewing the mouth portion 42 of the air bag 40 into loops. Next the air bag rods 46 are axially inserted in the side and end mouth portions 43, 45 through the loops. It will be appreciated that the rods 46 could alternately be sewn directly into the mouth portion 42 or that the rods 46 could be any thickened portion of the air bag 40 and could even be formed by overlapping or rolled layers of the air bag material itself and need not be separate rods.

After assembly of the air bag 40 including the rods 46, the mouth portion 52 of the air bag 40 is slipped over the top of the housing 20 such that the mouth portion 42 extends down over the upper tapered neck portion 26 and partially down over the lower portion 16. It is important that the rods 46 of the air bag 40 extend low enough on the housing 20 such that the retainer 50 can fit over the rods 46 of the air bag 40, as will now be described. Next, the retainer 50 with the upper retainer edges 51 leading, is slipped over the lower portion 16 of outer surface 33 of the housing 20 and over the rods 46 of the air bag 40 until the retainer 50 engages the upper tapered neck portion 26 of the housing 20. Then preferably, the retainer 50 is pushed upwardly for a flush, press slip fit between the upper and side neck walls 27, 28 and the upper and side retainer walls 52, 54 as best shown in FIG. 2. It will be appreciated that normally such a slip fit would not be sufficient to withstand the forces of air bag inflation. But advantageously, the outwardly tapered retainer 50 locks itself onto the outwardly tapered upper tapered neck portion 26 of the housing 20 during air bag deployment, as described further hereinafter. Either before or after attachment to the retainer 50, the air bag 40 is appropriately folded and placed in the housing 20. The inflator 7 may be axially inserted into the inflator opening 23 of the housing 20 at any convenient time during the assembly process and the folded air bag 40 rests generally atop of the inflator 7.

Finally, the cover door 90 may be easily attached to the module 10 by generally aligning the apertures 95 above the housing 20 and retainer 50 and moving the cover door 90 downwardly such that the side flanges 92 deflect outwardly over the tabs 30 of the retainer 50 until the apertures 95 are aligned with the tabs 30 such that the tabs 30 slip through the apertures 95. As best shown in FIG. 2, the apertures 95 are preferably oversized such that the cover door 90 may be adjusted relative to the housing 20 during assembly to the instrument panel of the vehicle. Thus, both the air bag 40 and the cover door 90 are easily attached to the housing 20 without the use of fasteners by the self-locking retainer 50.

The air bag module 10 functions as follows. Upon the sensing of certain vehicle conditions by sensors (not shown), the inflator 7 produces gas to inflate the air bag 40. The air bag 40 inflates and forces open the tear seam 91 on the cover door 90. The side flanges 92 on the cover door 90 are pulled upwardly and further onto the tabs 30 of the retainer 50 during air bag deployment such that the open halves of the cover door 90 are securely anchored to the housing 20. Thus, the inflation of the air bag 40 advantageously locks the cover door 90 to the retainer 50. In addition, the upward forces of the deploying air bag 40 pull upwardly on the rods 46 which in turn strongly force the retainer 50 upwardly on the upper tapered neck portion 26 of the housing 20.

Advantageously, the forces of the deploying air bag 40 are used to securely lock the retainer 50 to the housing 20. Thus, it will be appreciated that as the retainer 50 is pulled upwardly by the deploying air bag 40, the tapered side and end retainer walls 52, 54, increasingly and more strongly engage the side and end neck walls 27, 28, respectively such that the retainer 50 locks itself onto the housing 20. Accordingly, the air bag 40 is securely anchored to the housing 20 by the retainer 50 during deployment. It will also be appreciated that the side and end retainer walls 52, 54 fit flushly against the side and end neck walls 27, 28 and that the tapered shapes and smaller size of the retainer 50 limits the upward movement of the retainer 50 on the housing 20 during deployment.

Advantageously during air bag deployment, the retainer 50 is wrapped around the outer surface 33 of the housing 20 and helps to strengthen the side and end walls 27, 28 of the housing 20 to reduce the effects of bellmouthing of the housing 20 during air bag deployment. Also advantageously, this retainer 50 is well-adapted for use with plastic housings 20 since the retainer 50 distributes the forces of the deploying air bag 40 evenly around the housing 20 on all four sides. Also advantageously, it will be appreciated that the air bag 40 is attached to the outer surface 33 of the housing 20 and away from the inflator 7, such that the air bag 40 does not need to withstand the hot gases of certain types of inflators 7.

It will be understood that a person skilled in the art may make modifications to the preferred embodiment shown herein within the scope and intent of the claims. Although the preferred embodiment shows the retainer 50 as a generally rectangular continuous frame it will be appreciated that many other geometric shapes for the retainer 50 and housing 20 are possible. It will also be appreciated that the retainer 50 could alternately be formed by several pieces securely attached together.

Figure 4:
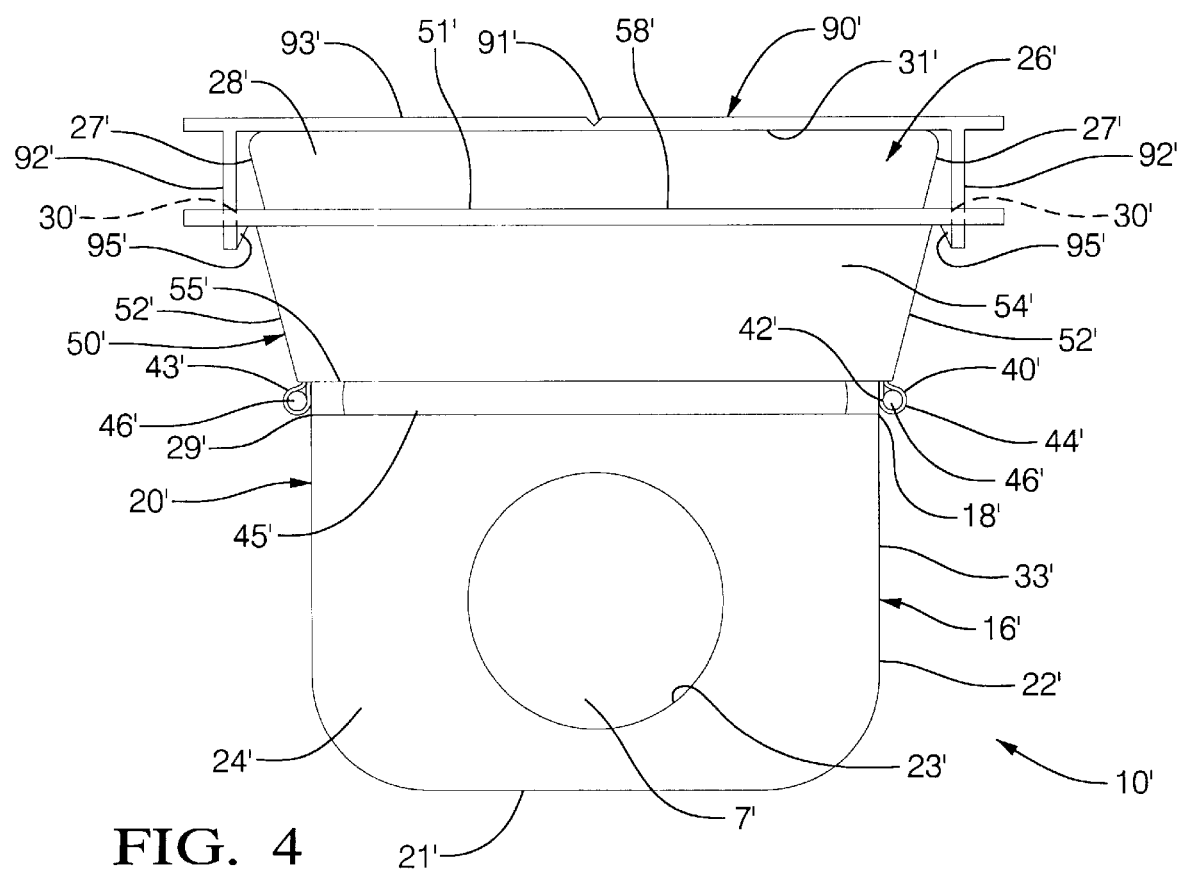
FIG. 4 is a side view of the alternate embodiment of FIG. 3 in the fully assembled condition.
Figure 3:
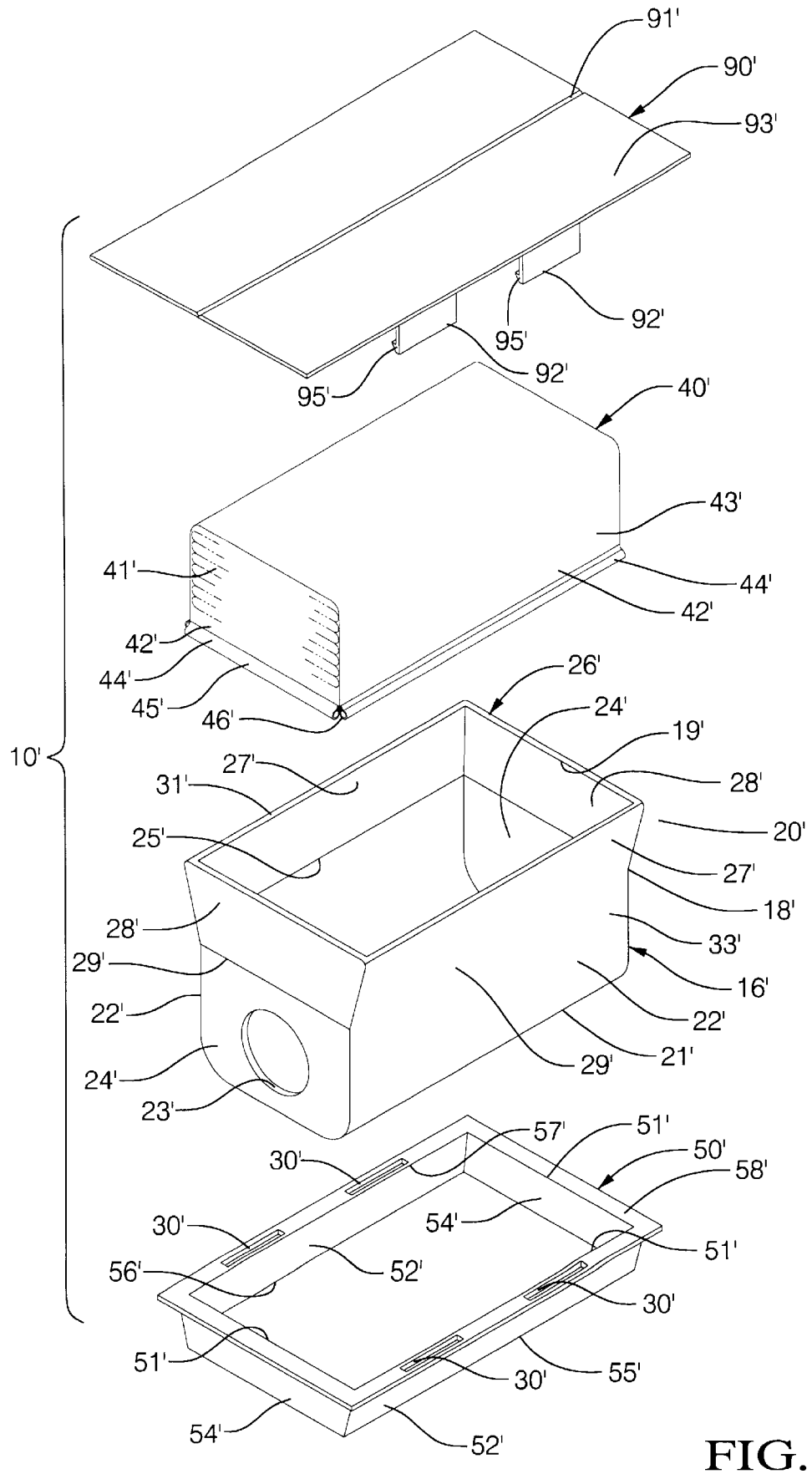
FIG. 3 is an exploded perspective view of an air bag module, similar to FIG. 1, but showing an alternate embodiment of the invention having an alternate cover door attachment.

FIGS. 3 and 4 show an alternate embodiment having an alternate cover door attachment. Similar components having similar descriptions to those in the embodiments of FIGS. 1 and 2 are denoted with the same numerals having a prime added.

Referring to FIGS. 3 and 4, an air bag module 10' includes the component parts of a housing 20', a self-locking retainer 50', a cover door 90', an air bag 40', and a plurality of air bag rods 46' attached to the air bag 40'. The module 10' also preferably includes an inflator 7' for generating gas to inflate the air bag 40'.

The housing 20' is preferably a canister having a lower portion 16' and an upper tapered neck portion 26'. The lower portion 16' includes a U-shaped bottom wall 21' terminating in upstanding spaced apart opposing side walls 22' connected by spaced apart opposing end walls 24' cooperatively defining a generally rectangular inner housing opening 25'. As shown in FIG. 1, one of the end walls 24' includes an inflator opening 23' through which the inflator 7' can be axially inserted and press fit to the housing 20'.

Advantageously in accordance with the present invention, the housing 20' also includes an upper tapered neck portion 26' in which a portion of the air bag 40' is normally stored prior to inflation. The upper tapered neck portion 26' includes spaced apart, opposing, nonparallel, side neck walls 27' connected by spaced apart, opposing, nonparallel, end neck walls 28'. The side and end neck walls 27', 28' diverge away from each other and are outwardly tapered. The side and end neck walls 27', 28' each have bottom edges 29' which are preferably integrally connected to the lower portion 16' at the inner housing opening 25'. The side and end neck walls 27', 28' each have upper edges 31' which are spaced outwardly away from the bottom edges 29'. The side walls 22' and end walls 24' cooperatively define a generally rectangular housing opening 19', which is larger than the inner housing opening 25'.

Referring to FIGS. 3–4, the air bag 40' is made of a conventional fabric material and is normally stored in a folded condition in the housing 20' atop of the inflator 7'. The air bag 40' includes a main folded portion 41' and a mouth portion 42' forming an air bag opening for receiving inflator gas therethrough. The mouth portion 42' includes a peripheral hem portion 44' formed by appropriately folding and stitching the air bag material into a loop. The mouth portion 42' of the air bag 40' includes opposing side mouth portions 43' and opposing end mouth portions 45' such that the mouth portion 42' has a generally rectangular shape with four sides. A plurality of air bag rods 46' are assembled to the air bag 40' by axial insertion into each of the side and end mouth portions 43', 45'.

The cover door 90' is preferably made of a plastic material and has an outer show upper surface 93' which preferably matches that of the instrument panel. The upper surface 93' includes a suitable tear seam 91' which breaks open during deployment under the force of the inflating air bag 40'. The cover door 90' also includes side flanges 92' located on opposing side edges of the cover door 90'. The side flanges 92' are preferably integrally formed with the upper surface 93' and are hingedly connected thereto to permit the halves of the upper surface 93' to pivot open upon air bag deployment. The downwardly extending side flanges 92' include hook portions 95' extending inwardly from the side flanges 92' and which are sized for snap-fitted attachment to the retainer 50', as described further hereinafter. The hook portions 95' are equivalent in number and spaced for corresponding alignment with holes 30' on flange portion 58' of the retainer 50' when the cover door 90' is attached to the retainer 50'. While the side flanges 92' are shown as two on each side of the cover door 90', it will be appreciated that the side flanges 92' could also be a single flange with several hook portions 95' thereon.

The self-locking retainer 50' includes spaced apart opposing, nonparallel, side retainer walls 52' connected by spaced apart opposing, nonparallel, end retainer walls 54'. The side and end retainer walls 52', 54' diverge away from each other and are outwardly tapered to match the angle of the taper on the side and end neck walls 27', 28' of the housing 20'. The side and end retainer walls 52', 54' each have upper retainer edges 51 ' that are spaced outwardly away from the bottom retainer edges 55'. Thus, the side and end retainer walls 52', 54' are each outwardly tapered to generally match the taper of the side and end walls 27', 28'. The upper retainer edges 51' of the side and end retainer walls 52', 54' cooperatively define a generally rectangular upper retainer opening 57', which is larger than the lower retainer opening 56'. The retainer 50' functions similar to the retainer 50 of FIGS. 1–2 for retention of the air bag 40'.

The retainer 50' also includes the generally outwardly projecting flange portion 58' that attaches to the upper retainer edges 51'. A plurality of retainer holes 30' extend through the flange portion 58'. The flange portion 58' and the holes 30' are preferably integrally formed with the retainer 50'. The holes 30' are preferably equivalent in number and spaced for corresponding alignment with the hook portions 95' on the cover 90'. The holes 30' are sized for a secure, tight snap-fitted attachment with the hook portions 95'.

The air bag module 10' is assembled as described above with reference to FIGS. 1–2, with the exception of the attachment of the cover 90' to the retainer 50'. The cover door 90' may be easily attached to the module 10' by generally aligning the hook portions 95' and the side flanges 92' above the housing 20' and retainer 50' and moving the cover door 90' downwardly such that the hook portions 95' are inserted through the holes 30' of the retainer 50' until the hook portions 95' snap into place under the flange portion 58' of the retainer 50'. It will be appreciated that both the air bag 40' and the cover door 90' are easily attached to the housing 20' without the use of fasteners by the self-locking retainer 50'. The air bag module 10' functions similar to that as described above with respect to FIGS. 1 and 2, except that the hook portions 95' hold the cover door 90' to the retainer 50' during air bag deployment.

While the present invention has been described as carried out in a specific embodiment thereof, it is not intended to be limited thereby but is intended to cover the invention broadly within the scope and spirit of the claims.

What is claimed is:

1. An air bag module for use in a vehicle comprising:
   an air bag having a thickened mouth portion;
   a housing for housing the air bag, the housing having an outer surface and including an upper tapered neck portion having outwardly tapered neck walls;
   a self-locking retainer having outwardly tapered retainer walls, the tapered retainer walls being sized and shaped for engagement with the outer surface of the tapered neck portion of the housing; and
   the thickened mouth portion of the air bag being trapped below the retainer on the outside surface of the housing; and
   the retainer having a lower retainer opening sized smaller than an upper retainer opening and wherein the neck portion has an upper housing opening that is sized larger than the upper retainer opening and wherein the neck portion has a lower opening sized smaller than the lower retainer opening;

whereby upon air bag deployment, the air bag forces the tapered retainer walls into increasing engagement with the tapered neck walls such that the retainer and air bag are securely locked onto the housing.

2. An air bag module for use in a vehicle comprising:

an air bag having a thickened mouth portion;

a housing for housing the air bag, the housing having an outer surface and including an upper tapered neck portion having outwardly tapered neck walls;

a self-locking retainer having outwardly tapered retainer walls, the tapered retainer walls being sized and shaped for engagement with the outer surface of the tapered neck portion of the housing; and the thickened mouth portion of the air bag being trapped below the retainer on the outside surface of the housing; and the retainer including upper retainer edges and lower retainer edges and wherein the upper retainer edges are spaced outwardly from the lower retainer edges and wherein the neck portion includes upper neck edges and lower neck edges and wherein the upper neck edges are spaced outwardly from the lower neck edges;

whereby upon air bag deployment, the air bag forces the tapered retainer walls into increasing engagement with the tapered neck walls such that the retainer and air bag are securely locked onto the housing.

3. An air bag module for use in a vehicle comprising:

an air bag having a thickened mouth portion;

a housing for housing the air bag, the housing having an outer surface and including an upper tapered neck portion having outwardly tapered neck walls;

a self-locking retainer having outwardly tapered retainer walls, the tapered retainer walls being sized and shaped for engagement with the outer surface of the tapered neck portion of the housing; and the thickened mouth portion of the air bag being trapped below the retainer on the outside surface of the housing; and the module including a cover door having a least one downwardly extending side flange having an aperture therethrough and wherein the retainer includes downwardly directed tabs, the tabs being adapted for extending through the apertures whereby upon air bag deployment, the force of the deploying air bag anchors the side flanges of the cover door beneath the tabs;

whereby upon air bag deployment, the air bag forces the tapered retainer walls into increasing engagement with the tapered neck walls such that the retainer and air bag are securely locked onto the housing.

4. The air bag module of claim 3 wherein the apertures are sized greater than the tabs such that the cover door is adjustable relative to the retainer and housing during assembly.

5. An air bag module for use in a vehicle comprising:

an air bag having a thickened mouth portion;

a housing for housing the air bag, the housing having an outer surface and including an upper tapered neck portion having outwardly tapered neck walls;

a self-locking retainer having outwardly tapered retainer walls, the tapered retainer walls being sized and shaped for engagement with the outer surface of the tapered neck portion of the housing; and the thickened mouth portion of the air bag being trapped below the retainer on the outside surface of the housing; and the module including a cover door having a least one downwardly extending side flange having a hook portion thereon and wherein the retainer includes at least one hole sized for snap-fitted attachment with the hook portion of the cover door to attach the cover door to the retainer and housing;

whereby upon air bag deployment the air bag forces the tapered retainer walls into increasing engagement with the tapered neck walls such that the retainer and air bag are securely locked onto the housing.

6. A method of assembling an air bag module comprising the steps of:

providing an air bag housing having an upper tapered neck portion and a lower portion positioned below the neck portion;

providing an air bag having a thickened mouth portion and dropping the thickened mouth portion over an outside surface of the housing;

providing a retainer having tapered retainer walls and inserting a lower portion of the housing through the retainer until the retainer engages the neck portion and traps the thickened mouth portion of the air bag beneath the retainer; and securely locking the retainer to the neck portion by deploying the air bag.

* * * * *